United States Patent Office 3,220,348
Patented Nov. 30, 1965

3,220,348
TYPOGRAPHIC PLATES AND PROCESS OF MAKING SAME

Paul Royer, Paris, France, assignor to Etablissements H. Royer & Ses Fils, Paris, France No Drawing. Filed May 14, 1962, Ser. No. 194,730
Claims priority, application France, May 23, 1961, 862,491
3 Claims. (Cl. 101—395)

This invention relates to typographic plates and to a process of making them. This invention is particularly applicable to the manufacture of improved copper electrotype plates which are light, strong, and accurate and will be described in relation to that subject. Such plates are frequently used on rotary printing presses.

Electrotype plates are most frequently made of electrolytically deposited copper which bears the image to be printed, but which is too light and fragile for extensive use. Such copper electrotypes are usually laminated to a backing, frequently of some lead alloy, the imperfections of which are well known to printers.

In order to avoid the imperfections of lead backed plates it has been proposed to make these plates entirely of natural or synthetic rubber or of resinous plastics which are easy to make, have the advantage of being light and relatively flexible, and give adequate results in a limited domain of application. Such plates have imperfections of their own which include printing problems such as fidelity of reproduction of fine lines and dimensional stability. The manufacture of lead backed electrotypes requires the heating of the plate to relatively high temperatures, which anneals and degrades the electrolytic copper, reducing its hardness. Furthermore, after cooling, there are defects of level in the surface caused by differences in the coefficient of expansion of the copper and the lead. The great weight of such plates makes them difficult to use in high speed presses or where the printing elements must be rapidly placed on the cylinders by adhesive. Another difficulty with the leaded plates is that they undergo undesirable deformation when they are bent as for application to a printing cylinder.

It is an object of the present invention to make printing plates which avoid the difficulties hereinabove recited, which are flexible, light, and have a printing surface which is hard and exact. Another object of the invention is to manufacture such novel plates and to provide them with true surfaces.

The objects of the invention are accomplished, generally speaking, by printing plates having a face of electrolytic copper and a backing layer composed of mixed thermohardening and thermoplastic resins, a plasticizer for the thermoplastic resin, and a hardener for the thermohardening resin, and by the method of making a printing plate which comprises applying to an electrotype a substantially uniform backing layer of a composition consisting in its essential elements of a thermoplastic resin and a thermohardening resin, which is adherent to the electrotype, and hardening the resin on the electrotype.

The new printing plates are constituted in their preferred form of a copper electrotype produced by any known means, bearing a plastic supporting layer of particular composition. The composition is composed of a mixture of a polymer or copolymer of vinyl chloride, a plasticizer for the polymer or copolymer, and a thermohardening resin and its hardener. The preferred thermohardening resins are of the epoxy class. These plastics are applied in liquid or paste state at room temperature, they adhere perfectly to the electrotype, they harden with heat and they are fleixble after hardening.

The plasticizers for the vinyl resin include any and all of the plasticizers which are generally useful with the particular vinyl chloride or copolymer of it. The phthalates such as dioctyl phthalate and decyl phthalate are exemplary and are used in their usual proportions.

The thermohardening resins which are used in the invention are liquid at room temperature, are miscible with the plasticizers of the vinyl resin, and are adhesive to the material. The epoxy resins and their derivatives are particularly useful. The quantity of thermohardening resins which are to be added to the polymers or copolymers of plasticized vinyl chloride are advantageously between about 8 and 30% by weight of the polyvinyl chloride or its copolymer. Varying the amount of thermohardening resin varies the hardness of the final composition. As hardening agents for the thermohardening resin one may employ all the hardeners which are known to be used with the particular resin, but one should select those which initiate the hardening of the resin in a time which approaches the time which is required to gel the polyvinyl chloride. Among the hardening agents which are especially useful with the epoxy resins are amines such as tridimethyl aminomethylphenol, diamino-diphenylsulfone, and 4,4'-methylene dianiline alone or in eutectic mixture with metaphenylene diamine in the usual proportions as applied in the prior art for hardening purposes.

The mixture of vinyl resin plasticizer, thermohardening resin, and hardener may be made at the time of use. Otherwise one may prepare two mixtures, one constituted by half the vinyl resin, half the plasticizer and all of the thermohardening resin; the other mixture will contain the other half of the vinyl resin, the other half of the plasticizer and all of the hardener. These mixtures may be kept and united at the time of use. The paste obtained by mixing the ingredients may also receive additions of viscosity reducing agents, pigments and fillers, if desired, in minor proportions.

The paste is applied to the back of a copper electrotype which is dry and free from grease. These electrotypes may be produced by any known means such as molding in wax or plastic or on lead or vinyl sheets, to cite examples. The process is very useful with the electrotypes which are made by means of a vinyl sheet such as the product which is known in commerce under the name of Lucotype.

The application of the resinous paste can be applied to the electrotype in any of the ways which are normally used to apply such pastes to objects, for instance by doctor blades or spreaders, by pouring, or by injection into a flat mold containing the electrotype. The plate thus formed is heated, for instance in an oven at 150° C. for 2 hours, or at 200° C. for 5 minutes, or, better at 175° C. for 15 minutes, which supplies sufficient heat to harden the backing. The hardening occurs practically without shrinkage. After cooling, the backing has a smooth surface which is hard but can be levelled off to a uniform thickness of ±.02 mm. This can be done by a planing machine and is successful even with large areas of surface. The back accepts the shape of the electrotype perfectly and adheres to it strongly; the adhesion increases during a course of some hours. The plate is light and has the benefit of a density of backing which is only ⅙ of that of a lead backing of the same thickness; it is flexible and its surface of impression is hard and true. It bends easily in the cold, by hand, without presenting the least elongation or forming flat spots. It is attached to the rotating press cylinder by the usual means. The plate may also be used flat with equal advantage on flat bed typographic printing machines or on all types of cylinder machines. The plate is inert to the solvents used in printing and is not affected by the highest temperatures to which it is subjected during printing. It transmits all the original lines and elements of the original, for instance, of photogravure prints, of wood cuts, and of type settings of movable type.

The following examples illustrate the invention without limiting the generalities of what has elsewhere herein been stated or claimed.

*Example 1*

100 grams of polyvinyl chloride paste, 30 grams of decyl phthalate, 26 grams of epoxy resin containing an epoxy equivalent of 200, having a molecular weight of about 350 to 400 and a viscosity of 120 poises at 25° C., and 7 grams of 4,4'-methylenedianiline were mixed together, the paste obtained was spread with a doctor blade over an electrotype plate which contained half tone reproductions in a layer 3.5 mm. thick. The plate was heated to 170° C. for 15 minutes and was cooled. The coating adhered strongly to the electrotype and had a hardness by Shore D of 47. The thickness of the coating was reduced to 3 mm. then was attached to the plate holder of the press by adhesive. Printing was carried out with perfect reproduction throughout 200,000 copies.

*Example 2*

A typographic plate reproducing a typographic composition for the impression of perforated cards of ordinator type was prepared in the same way as Example 1, with this difference that the paste only contained 14 grams of the same epoxy resin, and 3.78 grams of the same dianiline. The adherence of the backing to the electrotype was excellent and the hardness of the backing by Shore D was 44. After trimming to a thickness of 2.5 mm. the plate was mounted on a reciprocating press. The cards produced had the dimensional stability requisite to their use.

*Example 3*

A mixture of 60 grams of polyvinyl chloride, 10 grams of dioctyl phthalate, 7 grams of dibutyl phthalate, and 23 grams of the epoxy resin of Example 1, and 3 grams of ethylene tetramine was made. The electrotype which was a reproduction of administrative formulae designed for use with computing machines, was placed on a zinc plate inside a mold 4 mm. high. The paste was poured on the electrotype and covered with paper and then with a glass plate, the assembly was then put under pressure by means of a screw clamp and was hardened at 170° C. for 15 minutes. It was cooled and removed from the mold, the backing had good adherence, good appearance, ivory color, and a scaly look. After truing to a thickness of 2.5 mm. the plate was mounted on a reciprocating press. The printings obtained had satisfactory dimensional stability.

*Example 4*

100 grams of polyvinyl chloride, 31 grams of decyl phthalate, 28 grams of the commercial resin called Epon 820, and 3.2 grams of a surface active compound called Homoflex 21 were mixed together and 100 grams of polyvinyl chloride, 45 grams of decyl phthalate, 7.56 grams of an eutectic mixture of 4,4'-methylene dianiline and metaphenylene diamine, were mixed with 3 grams of Homoflex 21. The two pastes were mixed at the time of use and injected into four molds containing, respectively, yellow, blue, red and black electrotypes which were to be employed in a four color printing. The molds were heated to 170° C. for 15 minutes. After cooling and demolding the plates were trued to a thickness of 2.5 mm. The plates for yellow and red were bent, the others remaining flat. The plates were fixed on a Heidelberg cylinder printing machine and were applied in the order yellow, blue, red, and black. The printings were exactly superimposed without deviations from line and the contours of the images appeared in perfect coincidence.

The advantages of the invention include the production of a light, strong, copper electrotype plate which can be bent and trued to uniform thickness by simple means. Another advantage is a novel process of making backings for such composite plates and novel compositions of matter for this use. The parts of the composite plates have excellent adhesion which improves with aging at room temperature. The plate can be bent without damage and can be employed on either cylinder or flat bed machines over long periods and with the making of great numbers of copies. The adhesion of the parts of the composite plate is good and the composite plate can be attached to the ordinary plate carriers of presses by the same adhesives which have been previously used for this purpose with other types of plates.

As many apparently widely different embodiments of the present invention may be made without departing from the spirit and scope thereof, it is to be understood that the invention is not limited to the specific embodiments.

What is claimed is:

1. Printing plates having a face of electrolytic copper and a backing layer composed of mixed thermohardening and thermoplastic resins, a plasticizer for the thermoplastic resin, and a hardener for the thermohardening resin, the plasticizer being compatible with both resins, the thermohardening resin being of epoxy structure, and the thermoplastic resin being polyvinyl chloride, the epoxy resin being present between about 8 and about 30% by weight of the polyvinyl chloride.

2. A flexible printing plate consisting essentially of a copper electrotype attached to a backing support consisting in its essential ingredients of polyvinyl chloride, about 8 to about 30% by weight of a hardened epoxy resin, having a hardness about Shore D 40 to 50, and a plasticizer compatible with both resins.

3. The method of making a printing plate which comprises applying to an electrotype of copper a layer of a composition consisting in its essential elements of polyvinyl chloride and a plasticizer therefor which is compatible with thermohardening epoxy resins, a thermohardening epoxy resin in an amount between about 8% and 30% of the weight of the polyvinyl chloride and a hardener therefor, heating the electrotype with its resinous backing to a temperature about 150 to 200° C. until hard, cooling the plate, and evening the surface of the resinous backing.

References Cited by the Examiner

UNITED STATES PATENTS

| | | | |
|---|---|---|---|
| 2,108,822 | 2/1938 | Lippincott | 101—395 X |
| 2,114,288 | 4/1938 | Davis. | |
| 2,741,297 | 4/1956 | Vamvaketis | 101—395 X |
| 2,794,010 | 5/1957 | Jackson | 260—836 |
| 3,023,700 | 3/1962 | Bishop | 101—401.1 |
| 3,029,730 | 4/1962 | Parrish et al. | 101—401.1 |
| 3,145,654 | 8/1964 | Johnson et al. | 101—401.1 |

DAVID KLEIN, *Primary Examiner.*

WILLIAM B. PENN, *Examiner.*